(12) United States Patent
Valinejadshoubi et al.

(10) Patent No.: US 9,932,768 B2
(45) Date of Patent: Apr. 3, 2018

(54) SOLAR ENERGY-ABSORBING WINDOW STRUCTURE AND METHOD OF FORMING THEREOF

(71) Applicants: Masoud Valinejadshoubi, Mazandaran (IR); Mannan Ghanizadehgrayli, Mazandaran (IR)

(72) Inventors: Masoud Valinejadshoubi, Mazandaran (IR); Mannan Ghanizadehgrayli, Mazandaran (IR)

( * ) Notice: Subject to any disclaimer, the term of this patent is extended or adjusted under 35 U.S.C. 154(b) by 0 days.

(21) Appl. No.: 15/187,242

(22) Filed: Jun. 20, 2016

(65) Prior Publication Data
US 2016/0312525 A1    Oct. 27, 2016

(30) Foreign Application Priority Data

Jun. 19, 2015 (IR) .................. 139450140003003405

(51) Int. Cl.
*E06B 7/28* (2006.01)
*E06B 3/40* (2006.01)
(Continued)

(52) U.S. Cl.
CPC .............. *E06B 7/28* (2013.01); *E06B 3/2605* (2013.01); *E06B 3/325* (2013.01); *E06B 3/38* (2013.01); *E06B 3/40* (2013.01); *F24F 7/00* (2013.01); *H02S 20/22* (2014.12); *H02S 40/38* (2014.12); *E06B 2003/345* (2013.01);
(Continued)

(58) Field of Classification Search
CPC ...... H02S 40/38; H02S 20/22; F24F 2221/20; F24F 2007/004; E06B 3/2605; E06B 3/40; E06B 2003/345; E06B 2007/023
See application file for complete search history.

(56) References Cited

U.S. PATENT DOCUMENTS 4,039,018 A * 8/1977 De Maria ............. E06B 3/2605
                                                       160/187
4,149,520 A    4/1979 Arent
(Continued)

FOREIGN PATENT DOCUMENTS

DE           10140060 A1 *  3/2003  ............... E05C 7/02
DE        102005006010 A1    8/2006
(Continued)

*Primary Examiner* — Adriana Figueroa
(74) *Attorney, Agent, or Firm* — NovoTechIP International PLLC

(57) ABSTRACT

A window structure is configured to form a principal chamber enclosing a first window pane installed in an exterior wall of a building. The window structure includes a first surface configured to absorb solar energy and a main frame including a second window pane. An axial hinge is configured to allow to the main frame to tilt between a first position and a second position. When the main frame is tilted in the first position, the first surface is positioned in a first orientation that allows the first surface to directly receive sunlight through the second window pane. When the main frame is tilted in the second position, the first surface is positioned in a second orientation in which the first surface is prevented from directly receiving sunlight through the second window pane. The window structure may be used for ventilating the structure and shading during the warm weather.

18 Claims, 14 Drawing Sheets

HEATING

VENTILATE

(51) Int. Cl.
  *F24F 7/00*   (2006.01)
  *H02S 20/22*  (2014.01)
  *H02S 40/38*  (2014.01)
  *E06B 3/32*   (2006.01)
  *E06B 3/26*   (2006.01)
  *E06B 3/38*   (2006.01)
  *E06B 7/02*   (2006.01)
  *E06B 3/34*   (2006.01)

(52) U.S. Cl.
  CPC ... *E06B 2007/023* (2013.01); *F24F 2007/004* (2013.01); *F24F 2221/20* (2013.01); *Y02B 10/10* (2013.01)

(56) References Cited

U.S. PATENT DOCUMENTS

| | | | | |
|---|---|---|---|---|
| 4,295,417 A | * | 10/1981 | Isley | E06B 7/02 454/196 |
| 4,309,981 A | * | 1/1982 | Briggs | E04F 10/00 126/628 |
| 4,320,155 A | * | 3/1982 | Gillery | C03C 17/36 427/160 |
| 4,365,620 A | * | 12/1982 | Bliamptis | E06B 3/40 126/633 |
| 4,559,925 A | * | 12/1985 | Snow | F24J 2/0433 126/569 |
| 5,864,989 A | * | 2/1999 | Funatsu | E06B 5/12 49/141 |
| 6,646,196 B2 | | 11/2003 | Fronek et al. | |
| 6,829,861 B1 | * | 12/2004 | Kobrehel | E05D 1/04 16/355 |
| 7,083,110 B2 | * | 8/2006 | Kim | E06B 7/10 237/46 |
| 7,270,600 B2 | * | 9/2007 | Kim | E06B 7/10 454/196 |
| 8,123,142 B2 | | 2/2012 | Cislo | |
| 9,080,379 B2 | * | 7/2015 | Guillemette | E06B 3/5018 |
| 2010/0037526 A1 | | 2/2010 | Ohishi et al. | |
| 2014/0020312 A1 | * | 1/2014 | Seiling | H02S 40/38 52/173.3 |

FOREIGN PATENT DOCUMENTS

| | | | | |
|---|---|---|---|---|
| DE | 102005026537 A1 | * | 12/2006 | E04D 13/0354 |
| WO | WO 2011087381 A1 | * | 7/2011 | E06B 7/10 |
| WO | WO 2014083482 A1 | * | 6/2014 | E06B 7/02 |

* cited by examiner

HEATING

HEATING

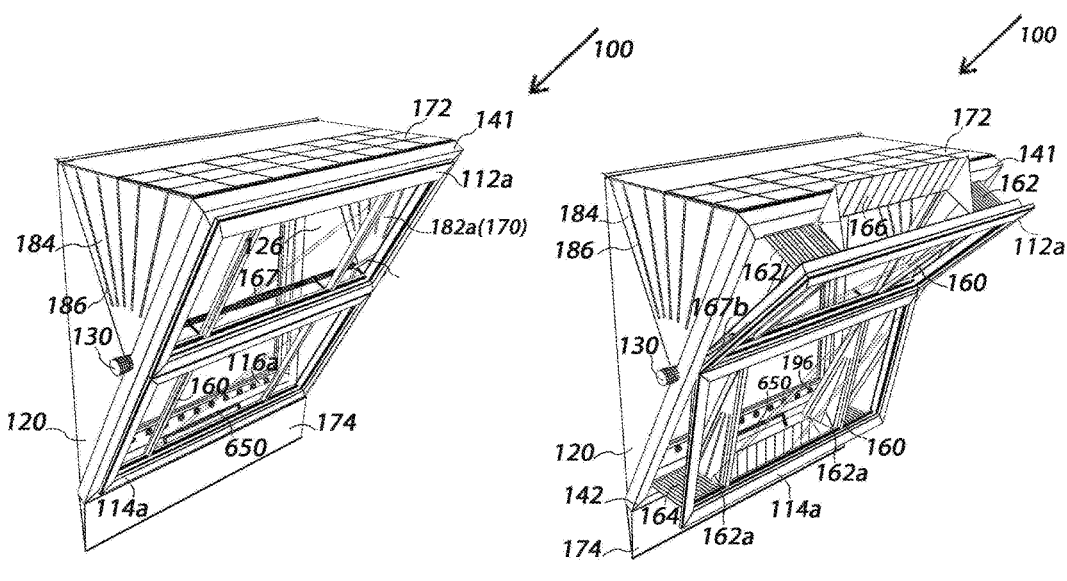

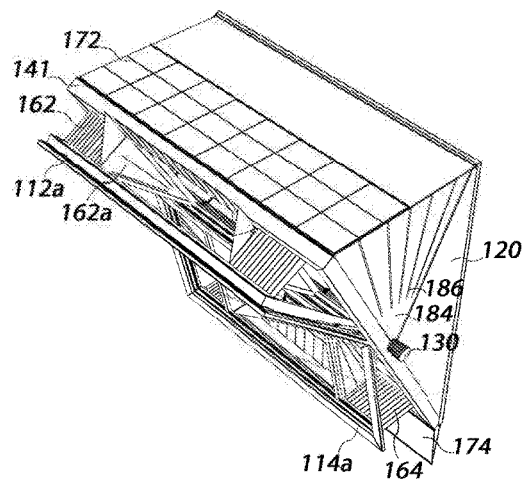
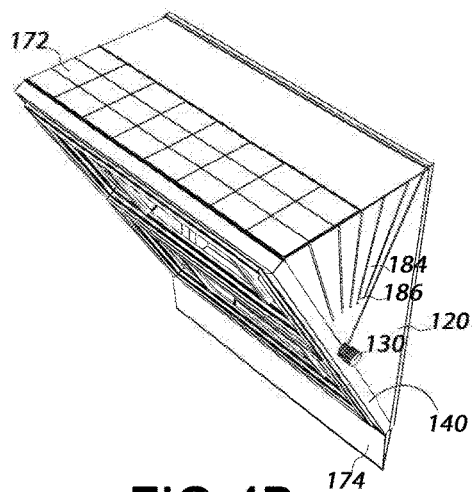
FIG.4A
VENTILATE
FIG.4B
AWNING

VENTILATE

AWNING

HEATING

HEATING

SECTION

SECTION

CLOSE

OPEN

HEATING

VENTILATE

SOLAR ENERGY-ABSORBING WINDOW STRUCTURE AND METHOD OF FORMING THEREOF

CROSS REFERENCE TO RELATED APPLICATION

This application claims the benefit of priority to an Iran patent application having serial number 139450140003003405 filed on Jun. 19, 2015, which is incorporated by reference herein in its entirety.

TECHNICAL FIELD

The present application relates generally to a window structure capable of absorbing solar energy and of switching between an upward and downward tilt position. In particular, the present application relates to a structure to absorb solar energy for heating in winter and air conditioning and shading in the summer.

BACKGROUND

Sources of renewable energies, in comparison with other sources of energy that are concentrated in limited number of countries, provide us with significant opportunities for economizing in consumption of energy in vast geographical areas, accompanied with energy security for the countries through leaning on interminable domestic sources, increasing of sustainability, reduction of air pollution and climate changes.

Population increase often results in excessive use of non-renewable energy resources, leading to increasing global warming and destruction of environmental masses. Many climatic changes in the coming 30 to 40 years may be influenced by current production of greenhouse gas and length of carbon dioxide's life time in Earth's atmosphere. It is one of the important objectives of many researchers around the world to move in the direction of meeting primary needs of human beings such as making the air warm or cool as well as achieving minimum level of using non-renewable energies.

Solar and wind energy are among the biggest and cheapest natural sources of energy. These huge sources of energy are capable of responding to a major part of human needs. Only 16.7% of the globally used energy comes from renewable energies and in the latter group, only 23% of it is from energies that depend on sun. This low percentage could be increased taking into account the complete availability of solar energy, its steadiness as well as its advantageous characteristics. On the other hand, proper ventilation and adjustment of the quality of internal air is an indispensable need for ensuring a healthy and comfortable life for human beings because 60% to 90% of our life time passes inside buildings. Hence, lack of proper ventilation and low or bad quality of internal air could result in respiratory diseases, allergy, asthma, etc., and it can directly impact the morale and work outcome of the residents.

One of the main disadvantages of the heating products using solar energy at the global level is that they use a unidimensional prospect and are not combined with other systems. Many of these systems only deal with heating of air while neglecting other aspects such as the light received by the internal space or an effective natural ventilation system or the view of the residents of the buildings.

SUMMARY

Disclosed is a window structure configured to form a principal chamber enclosing a first window pane installed in an exterior wall of a building. The window structure includes a main frame including a first frame portion, a second frame portion located opposite the first frame portion, and a second window pane located between the first frame portion and the second frame portion. An axial hinge is configured to allow to the main frame to tilt about a first axis disposed at a first distance from the first window pane. The main frame may be tilted between a first position and a second position. In the first position, the first frame portion is positioned less than the first distance from the first window pane and the second frame portion is positioned more than the first distance from the first window pane. In the second position, the first frame portion is positioned more than the first distance from the first window pane and the second frame portion is positioned less than the first distance from the first window pane. A first surface that is configured to absorb solar energy is located adjacent to the second frame portion. When the main frame is tilted in the first position, the first surface is positioned in a first orientation that allows the first surface to directly receive sunlight through the second window pane. When the main frame is tilted in the second position, the first surface is positioned in a second orientation in which the first surface is prevented from directly receiving sunlight through the second window pane. Moreover, in certain examples, opening the second window pane may cause air to circulate and facilitate air conditioning.

In certain cases, the first surface has a dark or black finish. In some examples, the first surface has a solar absorptance of at least 0.6.

In some examples, the first (energy-absorbing) surface may be configured to warm first air in an interior space of the principal chamber by absorbing the solar energy transmitted through the second window pane and transferring the solar energy to the first air in the principal chamber. Some example window structures may also include a fan that can transmit the first air warmed by the energy-absorbing surface from the interior space of the principal chamber to the interior of the building.

Certain example window structures may also include a heating element disposed on or near the fan. If the energy absorbed by the energy-absorbing surface is not sufficient to warm air to a certain temperature, the air may be warmed by the heating element, and the fan may transmit the air warmed by the heating element to the interior of the building. The window structure may also include solar energy cells on or adjacent an upper end of the principal chamber. These solar energy cells may produce energy that can power the heating element.

In certain examples, the window structure may include tubing connecting the interior space of the principal chamber to the interior of the building, and second air may be transmitted from the interior of the building into the interior space of the principal chamber through the tubing. The first surface may be further configured to warm the second air within the principal chamber.

In certain cases, the fan, which may be located on the top portion of the inside window pane, may also be used to transmit the warm air, warmed within the principal chamber, into the interior of the building. Simultaneously, the cold air may be transmitted from the interior of the building into principal chamber through the tubing in the bottom portion of the inside window for further warming and reaching the desired temperature.

Some examples of the disclosed window structure may include a first pane-frame connector. The main frame and the second window pane may have exterior surfaces facing outward of the building. The window structure may be in a closed position when the exterior surface of the second window pane is parallel to the exterior surface of the main frame, and the window structure may be in an open position when the exterior surface of the second window pane is at a non-parallel angle with the exterior surface of the main frame and a first end of the second window pane is separated from the first portion of the main frame. The first pane-frame connector may connect the first end of the second window pane to the first portion of the main frame when the first end of the second window pane is separated from the first portion of the main frame. In certain cases, the first pane-frame connector may be flexible and may be configured to multiply a force of suction of air exterior to the building and to discharge internal air of the building.

In some cases, the window structure may further include a third window pane having a first end that is separated from the second portion of the main frame when the window structure is in the open position. A second pane-frame connector may connect the first end of the third window pane to the second portion of the main frame when the first end of the third window pane is separated from the second portion of the main frame. The window structure may further include an opening mechanism configured to substantially simultaneously separate the first end of the second window pane from the first portion of the main frame and the first end of the third window pane from the second portion of the main frame. In certain examples, the opening mechanism may include a sliding lever.

In certain cases, the window structure may include a distributing panel in the interior of the building. The distributing panel may include the heating element. The distributing panel may also include an electrical energy storage element that can supply electrical energy to the heating element. There may be tubing that can transfer the first air from the interior space of the principal chamber to the distributing panel, which in some cases may be on the top portion of the inside window. The tubing may include a main tube connected to the fan, and auxiliary tubes connecting the main tube to the interior space of the principal chamber. Furthermore, the tubes, which may be located in the bottom portion of the inner window pane, may transmit the air from interior of the building to the principal chamber to warm the air.

In some cases, the window may include a handle disposed in the interior space of the principal chamber. The handle may be able to tilt the main frame between the first and second positions. In certain implementations, the window structure may include the first window pane.

Also disclosed is method of forming a window structure to form a principal chamber enclosing a first window pane installed in an exterior wall of a building. The method includes providing a main frame. The main frame includes a first frame portion, a second frame portion located opposite the first frame portion, and a second window pane located between the first frame portion and the second frame portion. The method further includes attaching the main frame to the exterior wall of the building so as to tilt about a first axis disposed at a first distance from the first window pane, such that the main frame may be tilted between a first position and a second position described above. A first energy-absorbing surface is attached to a location adjacent to the second frame portion. The formed window structure is configured to, when the main frame is tilted in the first position, position the first surface in a first orientation allowing the first energy-absorbing surface to directly receive sunlight through the second window pane in cold weather. The formed window structure is further configured to, when the main frame is tilted in the second position, position the first surface in a second orientation in which the first energy-absorbing surface is prevented from directly receiving sunlight through the second window pane in warm weather.

The disclosed window is multipurpose and it is easy to construct. In certain cases, where increasing the internal temperature of the building is needed, the proposed window may be exposed to the best angle of sunlight radiation by tilting. When reduction of internal temperature is needed, by axial turning of the main frame and transformation of the window to a sunshade, and by opening the window with different angles, the amount of air current and the reduction of internal temperature can be controlled.

One application of the disclosed window may be to use thermal energy of sun in order to provide buildings with warm air, as well as using wind energy for maximum benefiting of pleasant natural ventilation in buildings. Ventilation may be considered as the outcome of air suction as well as expulsion of the internal air. The elements related to the climate outside the building (temperature, radiation, humidity and wind) determine the need of a building to warming or cooling.

An object is to design a window to achieve spatial comfort through heat and current of air. This window can be used in all climates and different regions with various needs of heat and ventilation.

BRIEF DESCRIPTION OF DRAWINGS

The drawing figures depict one or more implementations in accord with the present teachings, by way of example only, not by way of limitation. In the figures, like reference numerals refer to the same or similar elements.

FIGS. 3A and 3B are top front left-side perspective views where the window structure is tilted downwards so that the solar energy transmitted through the window is reduced. FIG. 3A shows the window structure in a closed position, whereas FIG. 3B shows the window structure in an open position.

FIGS. 4A and 4B are top views of the window structure in a tilted downward position, showing solar energy cells on the outer part of the top shell of the window structure and a lower foldable panel extending from the bottom part of the window structure. FIG. 4A shows the window structure in an open position, whereas FIG. 4B shows the window structure in a closed position.

FIG. 5A shows the window structure in a closed position, whereas FIG. 5B shows the window structure in an open position.

FIG. 7B additionally shows the heating element.

FIG. 15A is a left-side cross-sectional view of the window of FIG. 14 in an upward tilt position. FIGS. 15B and 15C are enlarged views of corresponding details in FIG. 15A FIGS. 16A-C illustrate views of the window structure and its components shown in FIG. 14 in a downward tilt position and in open position.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry may have been described at a relatively high-level, without detail, in order to avoid unnecessarily obscuring aspects of the present teachings.

Disclosed is a window structure that can form a principal chamber enclosing a first window pane installed in an exterior wall of a building. The window structure includes a first surface that is capable of absorbing solar energy and a window pane in a frame that can rotate about a hinge and alternatively tilt upwards and downwards. When tilted upwards, the window structure absorbs solar energy and lets in more sunlight than when tilted downwards. In one example, the window structure can warm air using the absorbed solar energy and can transmit the warmed air into the building via a fan. In various examples, the disclosed window structure may have, among other things, one or more of the following functions: transmitting light, producing heat, creating natural ventilation, filtering produced hot air, and producing and storing electrical energy from solar light. In addition, two ancillary functions of certain examples of the disclosed window structure are sound and heat insulation. Also, in some cases, the disclosed window structure causes circulation of air in the interior of the building and it can increase the internal temperature of inside the building more rapidly.

The disclosed window structure may have a simple and an inexpensive structure. It may store electrical energy and be used in cold regions or regions that have cold nights. The window structure may also be used in regions that have warm periods during which lowering the interior temperature of a building is desirable. In certain examples, during the cold seasons, after suction of the internal air of the building and warming it, this air may be filtered and returned back to the internal space of the building. In warm seasons, by natural ventilation, examples of the disclosed window structure may cool the internal air of the building.

Figure 1:
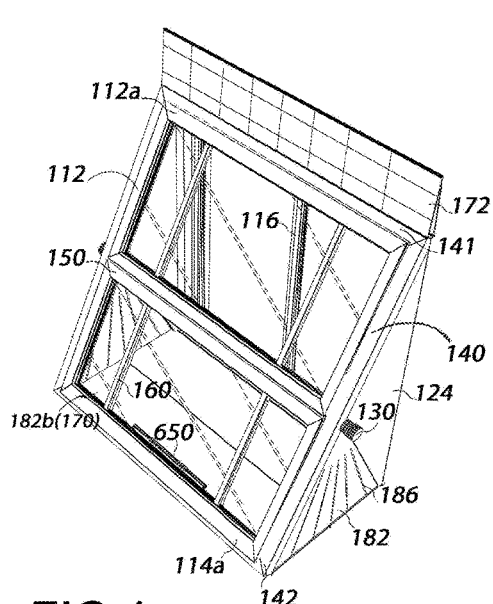
FIG. 1 is a top front right-side perspective view of an example window structure including an energy absorbing surface.

FIG. 1 illustrates an exemplary window structure 100 of the instant application. The window structure 100 may be configured to form a principal chamber 110 enclosing a first window pane 116 installed in an exterior wall of a building. The main form of the chamber 110 of this window structure 100 can be changed from inside the building (or outside the building, if desired) according to various needs of individuals during different seasons of the year. The window structure 100 includes at least one first surface 170 that is capable of absorbing solar energy, an axial hinge 130, a main frame 140, and a second window pane 112 disposed between the first and second portions 141 and 142 of the main frame 140. In certain examples, the principal chamber 110 may also include an outer pane frame 150 around the second window pane 112. The main frame 140 and the second window pane 112 have exterior surfaces facing outward of the building. An interior space may be formed between the main frame 140 and the first window pane 116. The second window pane 112 and the first window pane 116 may include anti-reflective glass but are not limited thereto. The axial hinge 130 may be configured to allow the main frame 140 to tilt about a first axis disposed at a first distance from the first window pane 116.

In some cases, the first axis may be horizontal. However, in some cases, the first axis may be vertical, diagonal, or in another non-horizontal configuration. Having a non-horizontal first axis may be beneficial for a non-south facing window in order to have the window more directly face the sun in an upright position. Also, in some cases, the first axis may be parallel to the first window pane 116, but is not limited thereto.

The first axis is disposed at a first distance from the first window pane 116. In some examples, the first axis may be disposed at least 10 cm from the inner pane. In certain cases, the first axis may be disposed at least 20 cm from the inner pane. In some examples, the first axis may be disposed at least 30 cm from the inner pane. In some cases, the first axis may be disposed at least 40 cm from the inner pane. In some examples, the first axis may be disposed approximately 40 cm from the inner pane. One of ordinary skill in art recognizes that other distances may be chosen between the first axis and the inner pane.

The main frame 140 may be tilted between a first (upward tilt) position to absorb solar energy for heating purposes in cold weather, and a second (downward tilt) position to cast shadows and air conditioning in warm weather. In the first position, the first frame portion 141 is positioned less than the first distance from the first window pane 116, and the second frame portion 142 is positioned more than the first distance from the first window pane 116. In the second position, the first frame portion 141 is positioned more than the first distance from the first window pane 116 and the second frame portion 142 is positioned less than the first distance from the first window pane 116.

The first surface 170, which is configured to absorb solar energy, is located adjacent the second frame portion 142. The window structure 100 is configured to position the first surface 170 in a first orientation when the main frame 140 is in the upward tilt position. Positioning the first surface 170 in the first orientation allows the first surface 170 to directly receive sunlight through the second window pane 112. The window structure 100 is also configured to position the first surface 170 in a second orientation when the main frame 140 is in the downward tilt position. Positioning the first surface 170 in the second orientation prevents the first surface 170 to directly receive sunlight through the second window pane 112. Throughout much of the specification, window pane 112 is referred to as "the second window pane," and window pane 114 is referred to as a "third window pane" present in certain examples of window structure 100. However, in other examples of window structure 100, the second window pane can alternatively be window pane 114 or a single window pane that includes panes 112 and 114 shown in the drawings.

In certain examples, the principal chamber 110 may include a bottom folding shell 182 and a top folding shell 184. The bottom and top shells 182 and 184 may include tubing 186 to facilitate opening and closing the folding shell. In those examples, the first surface (energy-absorbing surface) 170 may be located on one or both of inner side and bottom surfaces 182a and 182b of bottom shell 182. The energy-absorbing surface 170 may be metallic but is not limited thereto. When the window structure 100 is in the upward tilt position, the energy absorbing surface 170 on the inner side and bottom surfaces 182a and 182b absorbs solar energy transmitted through the second window pane 112.

In certain examples, the energy-absorbing surfaces 170, which may include inner side surfaces 182a and inner bottom surface 182b of the bottom shell 182, may have a dark finish. In some examples, the energy absorbing surfaces 170 may include metal that has a black finish. In certain cases, the energy absorbing surfaces 170 may be opaque.

In certain examples of the window structure 100, the first (energy-absorbing) surface 170 has a solar absorptance of at least 0.5. In some examples, the energy-absorbing surface 170 has a solar absorptance of at least 0.6. In certain cases, the energy-absorbing surface 170 has a solar absorptance of at least 0.7. In some examples, the energy-absorbing surface 170 has a solar absorptance of at least 0.8. In some examples, the energy-absorbing surface 170 has a solar absorptance of at least 0.9. In some examples, the energy-absorbing surface 170 has a solar absorptance of at least 0.95. The energy-absorbing surface 170 also preferably has a high thermal emittance in response to received solar radiation, such that solar radiation received by the energy-absorbing surface 170 more effectively heats air within the principal chamber.

To obtain a solar absorptance of a surface or material, reflectance as a function of wavelength is measured, from which the absorptance is then calculated by numerical integration of the measurements. For example, a spectrophotometer with an integrating sphere attachment for collecting specular and diffuse components of a surface or material may be used to obtain total reflectance versus wavelength values. The reflectance measurements are made over the portion of the electromagnetic spectrum from 300 to 2400 nm, since this region contains about 95 percent of solar energy.

NASA Reference Publication 1121, dated April 1984, entitled "Solar Absorptance and Thermal Emittance of Some Common Spacecraft Thermal-Control Coatings," which is incorporated by reference herein in its entirety, describes a first black anodized aluminum surface having a solar absorptance of 0.86 (and thermal emittance of 0.86), a second black anodized aluminum surface having a solar absorptance of 0.65 (and thermal emittance of 0.82), a surface painted with Carbon Black Paint NS-7 having a solar absorptance of 0.96 (and thermal emittance of 0.88), a surface painted with 3M Black Velvet Paint having a solar absorptance of 0.97 (and thermal emittance of 0.91), a surface painted with Magnesium Oxide White Paint having a solar absorptance of 0.09, a surface painted with Dow Corning White Paint DC-007) having a solar absorptance of 0.19, and a surface painted with Sherwin Williams White Paint A8W11 having a solar absorptance of 0.28.

In certain examples, the tilt position of the window 100 may not only affect heating but may also affect lighting. The amount of sunlight transmitted through the first outer pane 112 when the exterior surface of the main frame 140 is tilted downwards may be less than the amount of sunlight transmitted through the first outer pane 112 when the main frame 140 is tilted upwards. Hence, when the window structure 100 is in the downward tilt position it may function as a sunshade.

The principal chamber 110 may include a tilt mechanism that can be used or operated to tilt the main frame 140 upwards or downwards. The tilting mechanism can take any of various forms. For example, as shown in FIGS. 5A-6B show a tilting mechanism including a handle 650 on the interior side of the main frame 140. When the handle 650 is pushed, the exterior surface of the main frame 140 tilts upwards. When the handle 650 is pulled, the exterior surface of the main frame 140 tilts downwards. However, the tilting mechanism is not limited to the form described above. It can be manual, mechanical, or electrical, and can include buttons, dials, levers, springs, or other actuators or components.

The bottom and top shells 182 and 184 of the principal chamber 110 may be designed to be foldable to secure the best function in different circumstances. In the examples illustrated in FIGS. 2-3B and 5A-6B, when the handle 650 is pushed, the top shell 184 folds, and the bottom shell 182 unfolds. When the handle 650 is pulled, the bottom shell 182 folds, and the top shell 184 unfolds. The shells 182 and 184 may be folded and unfolded at different times of the year depending on different needs during the year. The bottom folding shell 182 and the top folding shell 184 may include tubing 186 to facilitate opening and closing the folding shells 182 and 184. The top shell 182 and the bottom shell 184 in the folded position may be disposed inside the supports 120.

In certain examples, there may be an upper foldable panel 172 that includes solar energy cells on an outer part of the top shell 184 of the window structure 100. When the exterior surface of the main frame 140 is tilted downwards and the window structure 100 functions as a sunshade, the panel 172 may be on the top surface of the top shell 184 and may face upwards (see FIGS. 3A and 3B, 4A and 4B). When the exterior surface of the main frame 140 is tilted upwards and the top shell 184 folds, the upper foldable panel 172 may fold upwards and face outward of the building (see FIGS. 1 and 2). Alternatively or additionally, in other cases there may be solar energy cells on other surfaces of the top shell 184 or other parts of the principal chamber 110.

In some cases, the window structure 100 may also include an energy-absorbing lower foldable panel 174 forming the bottom of the bottom shell 182. When the window structure 100 is in the upward tilt position, and the bottom shell 182 is unfolded, the inner bottom surface 182b of the bottom shell 182 is the upper surface of lower foldable panel 174. When the window structure 100 is in the downward tilt position, the lower foldable panel 174 may be folded downward such that surface 182b faces outward of the building (see FIGS. 2-4B).

Figure 7A:
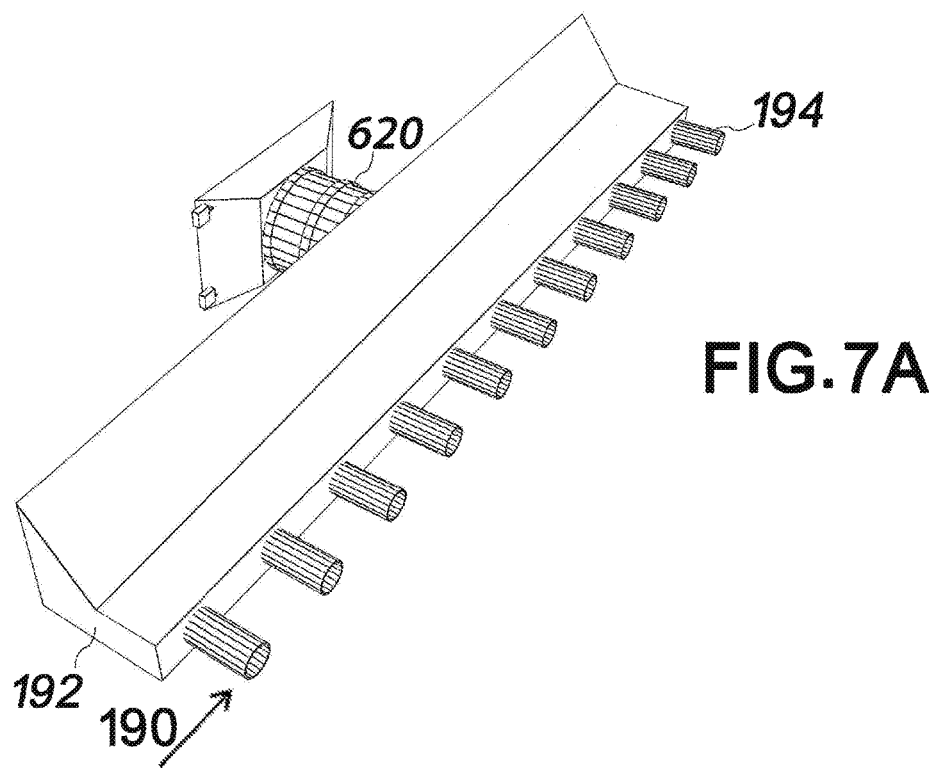
FIGS. 7A and 7B are perspective views of a fan connected to tubing that may be used to transfer air from the window structure to the interior of the building.
Figure 7B:
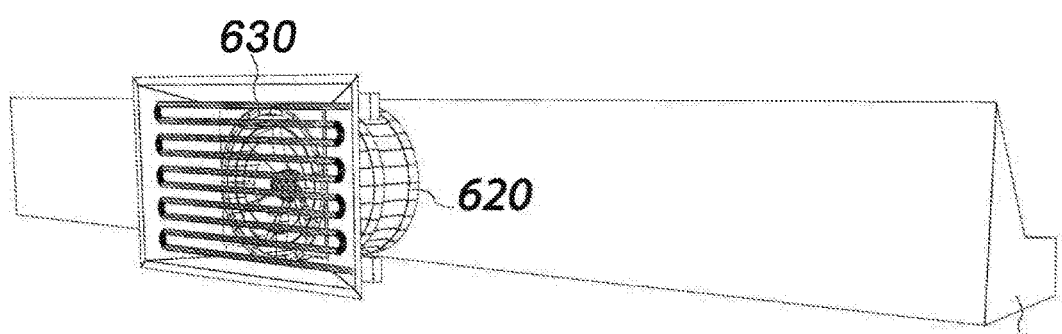
Figure 7C:
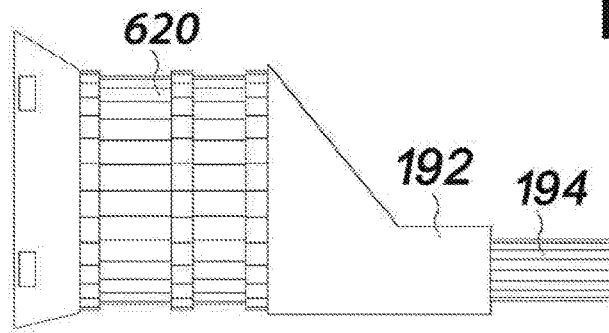
FIG. 7C is a side view of the fan and tubing.

Certain examples of the disclosed window structure 100 may include transfer tubing 190 and 196. Tubes 196 are located on lower part of the interior window pane for transferring the air from the interior of the building to the principal chamber 110. Transfer tubing 190 further divided into two parts:

a) Main tube 192: In these examples, the main tube 192 may be located in the upper part of the interior of the building near or adjacent the first window pane 116. The main tube 192 may transfer the heated air back into the building interior.

b) Auxiliary tubes 194: The auxiliary tubes 194 connect the principal chamber 110 to the main tube 192. The auxiliary tubes 194 transfer the heated air inside the principal chamber 110 to the main tube 192. These tubes 194 may be installed in the frame 116a of the first window pane 116 window in various numbers, depending on the window's width (see FIGS. 7A-8). The auxiliary tubes 194 may be made of polyvinyl chloride (PVC) but are not limited thereto. In certain examples, each of the auxiliary tubes 194 may have a smaller diameter than the main tube 192.

In certain examples, the window structure 100 may include a distributing panel 510 located in the interior of the building. In these examples, warm air is transferred between the tubing 190 and the building interior via the distributing panel 510. The distributing panel 510 houses a fan 620. The main tube 192 connects the auxiliary tubes 194 to the fan 620. The fan 620 may discharge the air heated in the interior space of the principal chamber 110 from the main tube 192 into the interior of the building. (see FIGS. 6A-7C). In certain examples, the fan 620 may include a filter layer to filter the air in the system. The filter layer may include nano-composite membranes but is not limited thereto.

In certain examples, the distributing panel 510 may house a heating element 630. At certain times, such as on cloudy days, the energy-absorbing surfaces 170 in the principal chamber 110 may not absorb enough solar energy to directly heat air in the quantities or temperatures needed at those times. Therefore, certain examples of the disclosed window structure 100 include a heating element 630 that can warm air when the solar energy directly transmitted by the energy-absorbing surfaces 170 is not sufficient. At those times, the heating element 630 may be used instead of or in addition to the energy-absorbing surfaces 170. Air may be blown by the fan 620 towards the heating element 630, resulting in an increase of the temperature of the air (see FIG. 6A-7C). The heating element 630 may be powered by energy stored in storage element 640 described below, or it may alternatively be powered by another energy source that is not necessarily included in the window structure 100.

Certain examples of the window structure 100 may include an electrical energy storage element 640. A function of the electrical energy storage element 640 is to store the electrical energy produced by the solar energy cells on the upper foldable panel 172 disposed at the upper part of the window structure 100. The electrical energy storage element 640 may be configured to supply electrical energy to the heating element. When sufficient sunlight is not available, the electrical energy stored in this element 640 may be used to power the heating element 630 and thereby warm the air of rooms in the building interior (see FIG. 6B). The outside part of the heating element 630 may include an adjustable gate 644 to transfer the warm air into the interior building.

The distributing panel 510 may include a controller 642 which can command the fan to start and stop based on the surrounding information. The distribution panel 510 also may work manually (see FIGS. 6A-B). At certain times, for example on hot days, ventilation may be desired. The window structure 100 may be opened by separating a first end 112a of the second window pane 112 from the first portion 141 of the main frame 140. In the examples illustrated in FIGS. 3A-4B, the first end 112a is the top end of the second window pane 112, and the first portion 141 is the top portion of the main frame 140. When the window structure 100 is closed, as shown in FIGS. 3A and 4B, the exterior surface of the second window pane 112 is parallel to the exterior surface of the main frame 140. However, in the examples shown in FIGS. 3B and 4A, the exterior surface second window pane 112 is tilted further downwards than the exterior surface of the main frame 140 when the window structure 100 is open.

At least one first pane-frame connector 162 may connect the first end 112a of the second window pane 112 to the first portion 141 of the main frame 140 when the first end 112a of the second window pane 112 is separated from the first portion 141 of the main frame 140. The first pane-frame connector 162 may include a flexible material such as fabric, but is not limited thereto. In certain examples, the window structure 100 may include two first pane-frame connectors 162 and 162a that are fabric partitions and are disposed on two sides of the first portion 141 of the main frame 140 (see FIGS. 3B and 4A). The first pane-frame connector 162 and 162a may multiply a force of suction of air exterior to the building and to discharge internal air of the building and may generate positive and negative pressure for suction and discharge of the air in different directions of airflow.

In the examples illustrated in FIGS. 3A-4B, the window structure 100 further includes a third window pane 114 having a first end 114a that is separable from the second (bottom) portion 142 of the main frame 140. The first end 112a and the first end 114a may open and close simultaneously for proper operation. The first end 114a may be the bottom end of the third window pane 114, and it may separate from the bottom portion 142 of the main frame 140. In these examples, at least one second pane-frame connector 164 may connect the first end 114a of the third window pane 114 to the second portion 142 of the main frame 140 when the first end 114a of the third window pane 114 is separated from the second portion 142 of the main frame 140. Opening the window structure 100 in the above manner may generate pleasant natural ventilation through the suction and discharge of air. While, during the warm season, the first window pane 116 may separate from the first window frame 116a to improve air conditioning, during cold season, the first window pane 116 may attach to the first window frame 116a to warm the air.

In certain examples, the first pane-frame connector 162 and the second pane-frame connector 164 may be included in a substantially vertical post 160. In these examples, when both the top and bottom of the window structure 100 are open (i.e. the first end 112a of the second window pane 112 is separated from the first portion 141 of the main frame 140 and the first end 114a of the third window pane 114 is separated from the second portion 142 of the main frame 140), the first and second pane-frame connectors 162 and 164 in post 160 are unfolded. When the top and bottom of the window structure 100 are closed, the first and second pane-frame connectors 162 and 164 are folded in post 160.

Figure 16A:
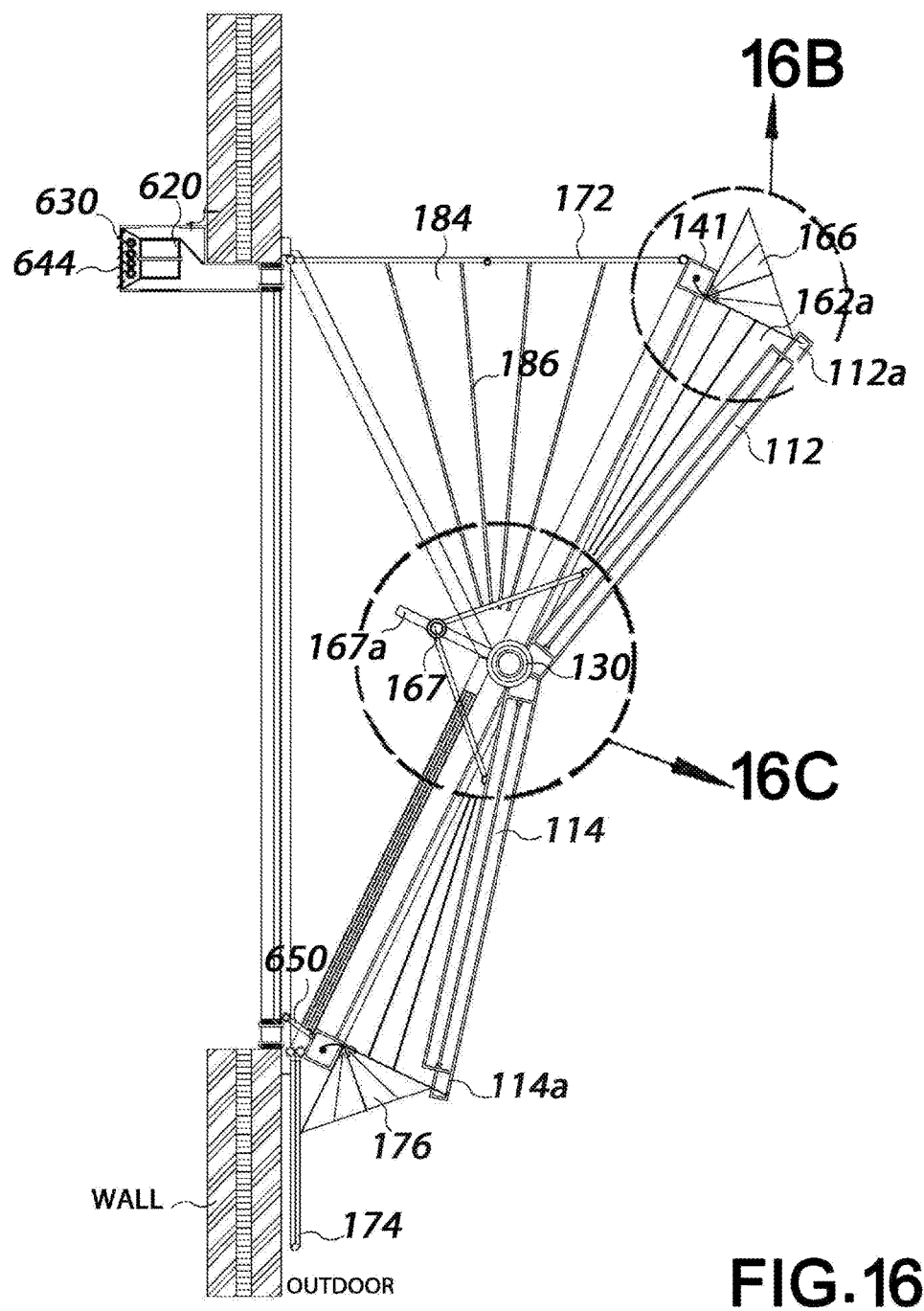
FIG. 16A is a left-side cross-sectional view of the window structure in a downward tilt position, with the window open.
Figure 15B:
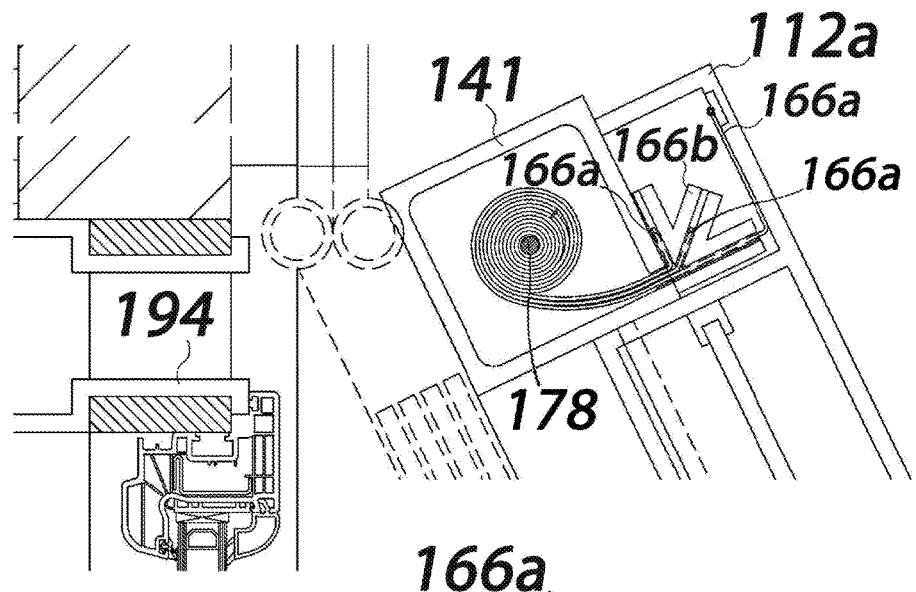
Figure 16B:
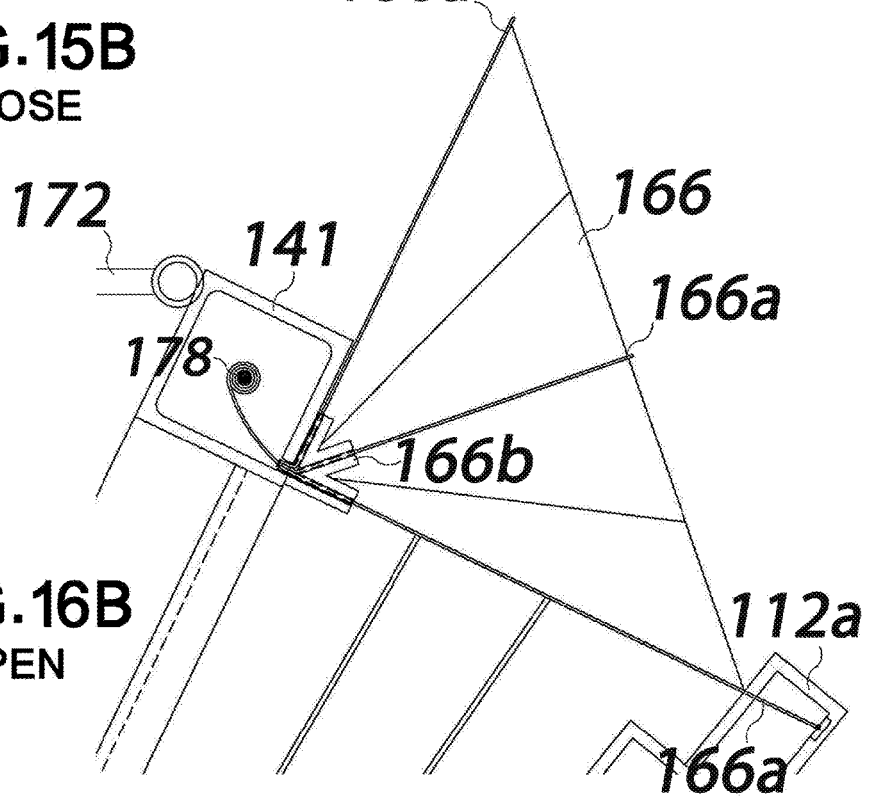
FIGS. 16B and 16C are enlarged views of corresponding details in FIG. 16A.

In certain examples, when the second window pane 112 opens for ventilation, triangular-shaped folding shells 166 and 176 opens toward the exterior of the building (see FIGS. 16A-B). The folding shell improves the ventilation process. In an example, the folding shell 166 is connected to the first end 112a of the second window pane 112 on one side and to the first portion of the main frame 140 on the other side. The folding shell consists of three spring-shaped bars 166a which may move on a rail 166b. The spring-shaped bars 166a are connected in rear of the rail 166b to a spring around a rotation center 178. The spring-shaped bars 166a and the rotation center 178 may pull the folding shell 166 and 176 toward the main frame 140 when the second window pane 112 is closed. The folding shell 166 and 176 returns to the original location upon opening the second window pane 112 to maximize the air drift for ventilation as shown in FIGS. 15B and 16B.

The window structure 100 may be opened using a window opening mechanism. The window opening mechanism may include a sliding lever but is not limited thereto. In the examples illustrated in FIGS. 5A-6B and 15A-16B, the window opening mechanism (including 167, 167a, and 167b) is in the interior space of the principal chamber 110. When the window opening mechanism is activated, the first end 112a of the second window pane 112 separates from the first portion 141 of the main frame 140 and the first end 114a of the third window pane 114 separates from the second portion 142 of the main frame 140. The window opening mechanism can be activated again to close the top and bottom of the window structure 100 (i.e. to bring the first end 112a of the second window pane 112 to be adjacent the first portion 141 of the main frame 140 and the first end 114a of the third window pane 114 to be adjacent the second portion 142 of the main frame 140). In the illustrated examples, the opening lever 167 is connected to the frame 160a in two points through bar 167a. The opening lever 167 may also be connected to the second window pane 112 by some levers 167b (as shown on FIGS. 15C and 16C).

Figure 2:
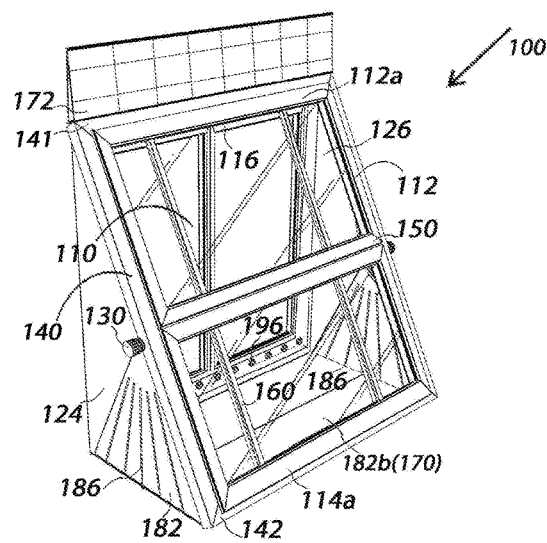
FIG. 2 is a top front left-side perspective view of the window structure tilted upwards such that it is exposed to sunlight radiation.
Figure 5B:
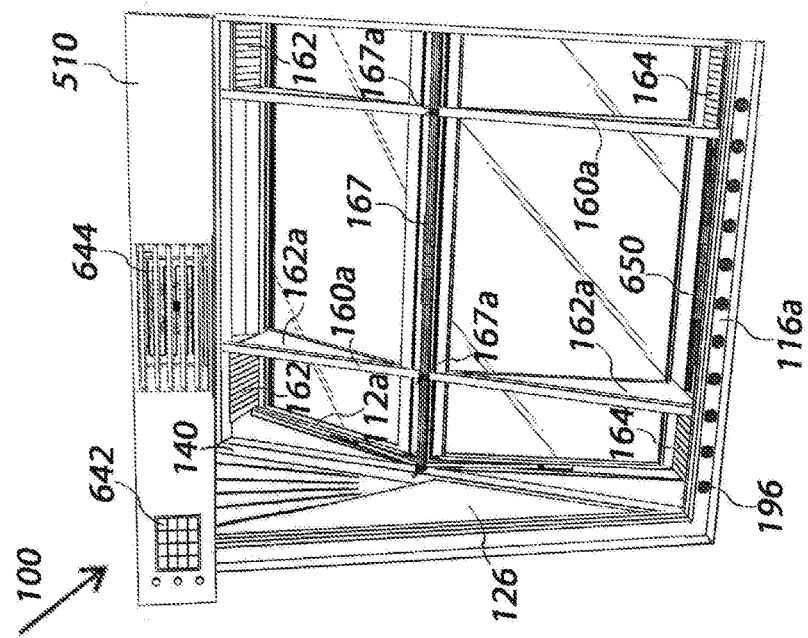
FIGS. 5A and 5B are rear perspective views of the window structure in a tilted downwards position and including an opening mechanism that can be activated in order to open the top and bottom of the window structure to conduct the outside air towards the internal space of the building.
Figure 5A:
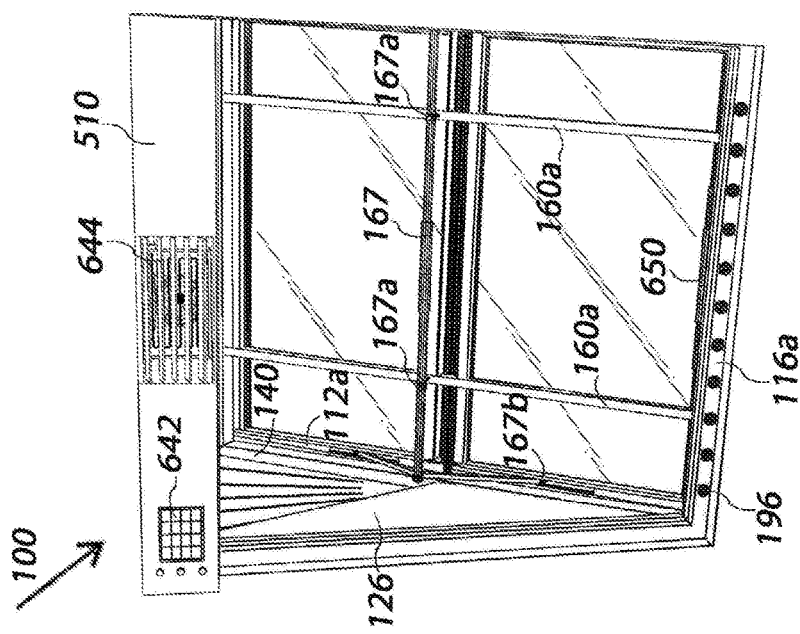
Figure 6A:
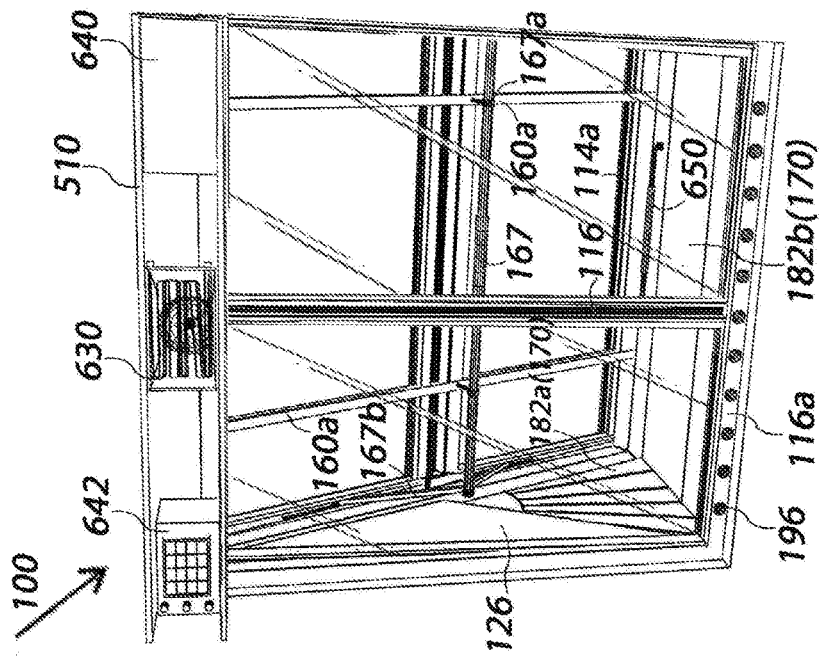
FIGS. 6A and 6B are rear perspective views of the window structure tilted upwards and including a heating element installed to warm the internal air and increase the internal temperature.
Figure 6B:
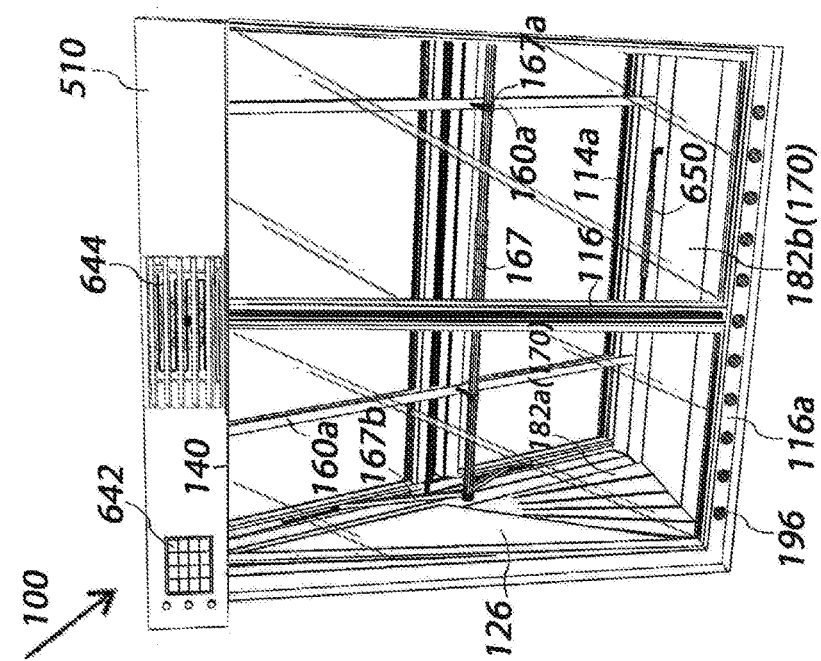

In addition to providing heat for the building, by changing the angular position of window frame 140, light needed to illuminate the internal space can be secured and a pleasant natural ventilation and comfort can be provided to the residents in different circumstances and conditions (FIGS. 2 and 3A-B).

In some examples, the disclosed window structure 100 may include un-plasticized polyvinyl chloride (uPVC), and the energy-absorbing surface 170 at the bottom of the window may include metal. Also, in some cases, the second window pane 112, the third window pane 114, and the first window pane 116 may include anti-reflective glass, which may enable the energy-absorbing surface 170 to absorb a maximum amount of sunlight and to prevent the produced heat from leaving through the glass.

In cold seasons where increasing the temperature of the building is needed, the main frame 140 can be tilted upwards, so the bottom shell 182 of the window structure 100 is moved forward. Then the sunlight may warm the energy-absorbing surface 182b of the lower foldable panel 174 and increase the temperature inside the principal chamber 110. The air inside the principal chamber 110 that is heated via the energy absorbing surfaces 170 is sucked by the fan 620 from the interior space of the principal chamber 110 and transferred to the interior of the building.

In warm seasons, when there may be a need for ventilation inside the building, by activating the opening mechanism, the window structure 100 opens at the top and bottom (as discussed above) in order to conduct the outside air towards internal space of the building. In certain cases, the internal ventilation of the building at the time of a need to reduce the temperature may function better if direct sunlight is prevented from entering the building. Therefore, in those examples, the window structure 100 opens when the exterior surface of the main frame 140 is tilted downwards. However, in certain cases it may be possible to open the window structure 100 in the upward tilt position as well.

In general, where increasing the internal temperature of the building is needed, the disclosed window structure 100 can be exposed to a beneficial or optimal angle of sunlight radiation by a simple turning of the main frame 140 about the axial hinge 130 (FIG. 2). On the other hand, where reduction of internal temperature is needed, in a first phase by axial turning of the main frame 140 and the transformation of the window structure 100 to a sunshade and in a second phase by opening the window structure 100 so that the first window pane 112 may be positioned at a non-parallel angle with respect to the main frame 140, and third window pane 114 may be separated from the main frame 140 by the same non-parallel angle in the opposite angular direction. In this way, the amount of air current and the reduction of the internal temperature of the building can be controlled (see FIGS. 3A AND 3B).

An installation process of the window structure 100 is explained below and is illustrated in FIGS. 8-13.

Figures 8, 9, 10:
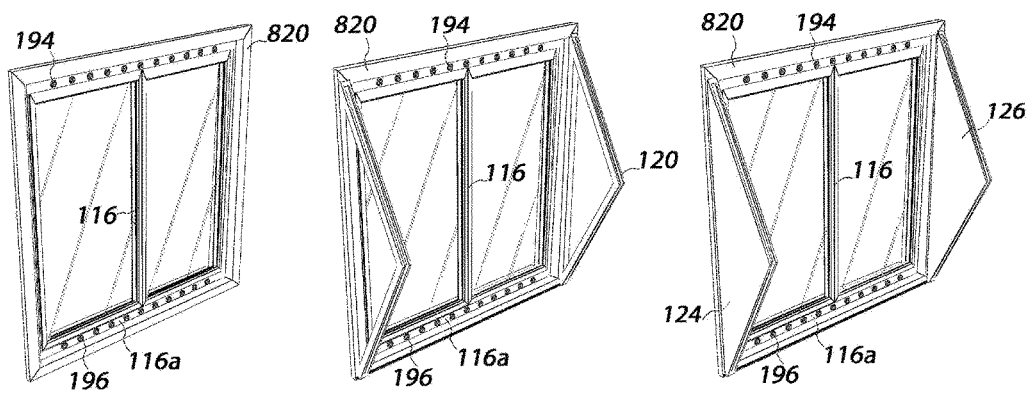
FIG. 8 shows the first window pane installed in the building exterior as viewed from outside the building without an exterior portion of the window structure installed. Also shown is a front view of a base plate that supports the weight of the window structure and auxiliary tubes that can transfer the heated air produced inside the window structure towards inside the building and connect the interior space of the principal chamber of the window structure to a main tube.
FIG. 9 is a front left-side perspective view of a portion of the window structure including two supports attached to the base plate to keep the window structure attached to a wall of the building.
FIG. 10 is a front left-side perspective view of a portion of the window structure where each of the supports has an outer side and an inner side.

In order to install different parts of the window, in the first phase a base plate 820 that supports the overall weight of the window may be attached to the wall (see FIG. 8). The base plate 820 may be made of metal, but is not limited thereto, as any material strong enough to support the weight of the window and keep it attached to the wall may be used. Also, the base plate 820 may be attached to the wall by screwing, but is not limited thereto. FIG. 8 shows the plate 820, the first window pane 116, the first window pane frame 116a, and auxiliary tubes 194 and 196 installed in the first window pane frame 116a. The base plate 820 may be installed before or after the first window pane 116 is installed in the wall of the building. In some examples, the first window pane 116 is installed in the wall of the building prior to the forming of the window structure 100. In other examples, the first window pane 116 is included in the window structure 100.

Next, two supports 120 are attached to the base plate 820 (see FIG. 9). The supports 120 may have a triangular shape but are not limited thereto. They may be screwed and welded to the base plate 820 but are not limited to those forms of attachment. The supports 120 may be metallic but are not limited thereto. The two inner sides 126 of supports 120 may be capable of absorbing energy (see FIG. 10). In some examples, the inner sides 126 may include metal, and in some cases may have a dark or black finish. The outer sides 124 of the supports 120 may include compressed plastic, but are not limited thereto (see FIG. 10). Between the outer and inner sides 124 and 126, there may be a thermal insulator so that heat is not transferred from inside the inner space of the principal chamber 110 to the outside via the supports 120.

Figures 11, 12, 13:
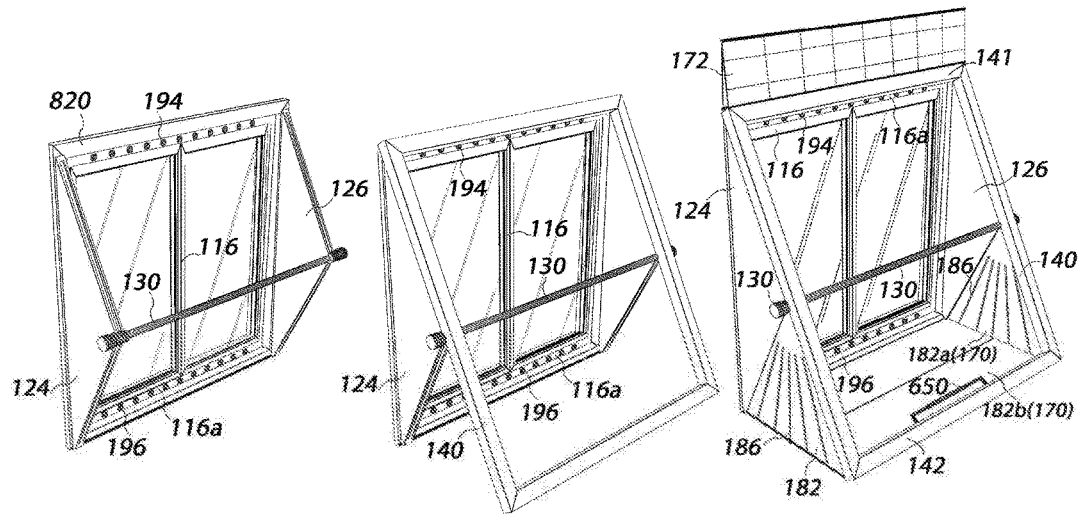
FIG. 11 is a front left-side perspective view of a portion of the window structure including an axial hinge to change the position of the window structure.
FIG. 12 is a front left-side perspective view of a portion of the window structure showing a main frame of the window structure.
FIG. 13 is a front left-side perspective view of a portion of the window structure where the main frame is installed on the hinge and upper and lower foldable panels are installed on the window structure.
Figure 14:
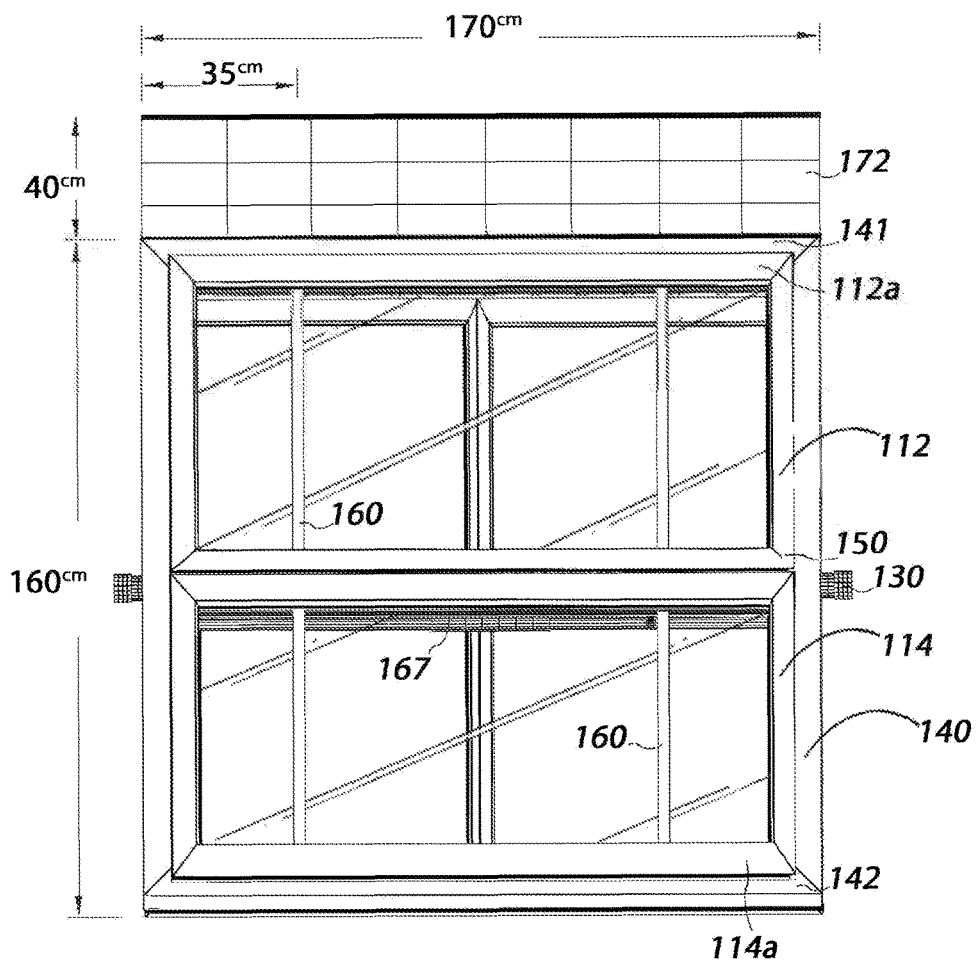
FIG. 14 is a front view of the window structure including one example of possible dimensions.

FIG. 11 shows an example where the axial hinge 130 is placed on the triangular supports 120 to enable the attachable window structure 100 to tilt about this hinge 130. FIG. 12 shows an example where after installation of the hinge 130, the main frame 140 is installed on it. Next, as shown in FIG. 13, the top shell 184, the upper foldable panel 172, and the bottom shell 182 including the lower foldable panel 174 (not necessarily in that order) of the window structure 100 may be installed. Then, the outer pane frame 150 and the first and third window panes 112 and 114 may be installed, as shown in FIG. 14.

The distributing panel 510 may be installed inside the building (see FIGS. 5A-6B). The distributing panel may house the fan 620, the heating element 630 and the electricity storage element 640. The fan 620 may include a thermometer. The fan 620 is configured to return the air to the interior of the building after the air is heated. The storage element 640 stores the electricity produced by solar energy cells in panel 172. When the solar light absorbed by panel 172 is not sufficient to directly produce warm air, the heating element 630 may use the electricity produced by the solar energy cells in panel 172 previously and stored by the storage element 640 to heat the air. The distributing panel 510 may be installed on top of the first window pane 116, but is not limited thereto.

Examples of the disclosed window structure 100 can be used as part of a building's structure at the time of its construction, or they can be installed as an attachment to existing windows or skylights. The example construction steps described above and illustrated in FIGS. 8-13 begin with the attachment of base plate 820 to the wall of a building and gradually adding other parts of the window structure 100 to the base plate 820. However, in certain examples, the whole attachable window structure 100 may be pre-fabricated and put together in the factory and afterwards installed at the building site. Alternatively, the attachable window structure 100 may be built or put together at the building site. In some cases, the first window pane 116 may have been installed in the exterior wall of the building prior to or separately from the assembly of the window structure 100. Alternatively, in some examples, the first window pane 116 may be included in the window structure 100.

Figure 15A:
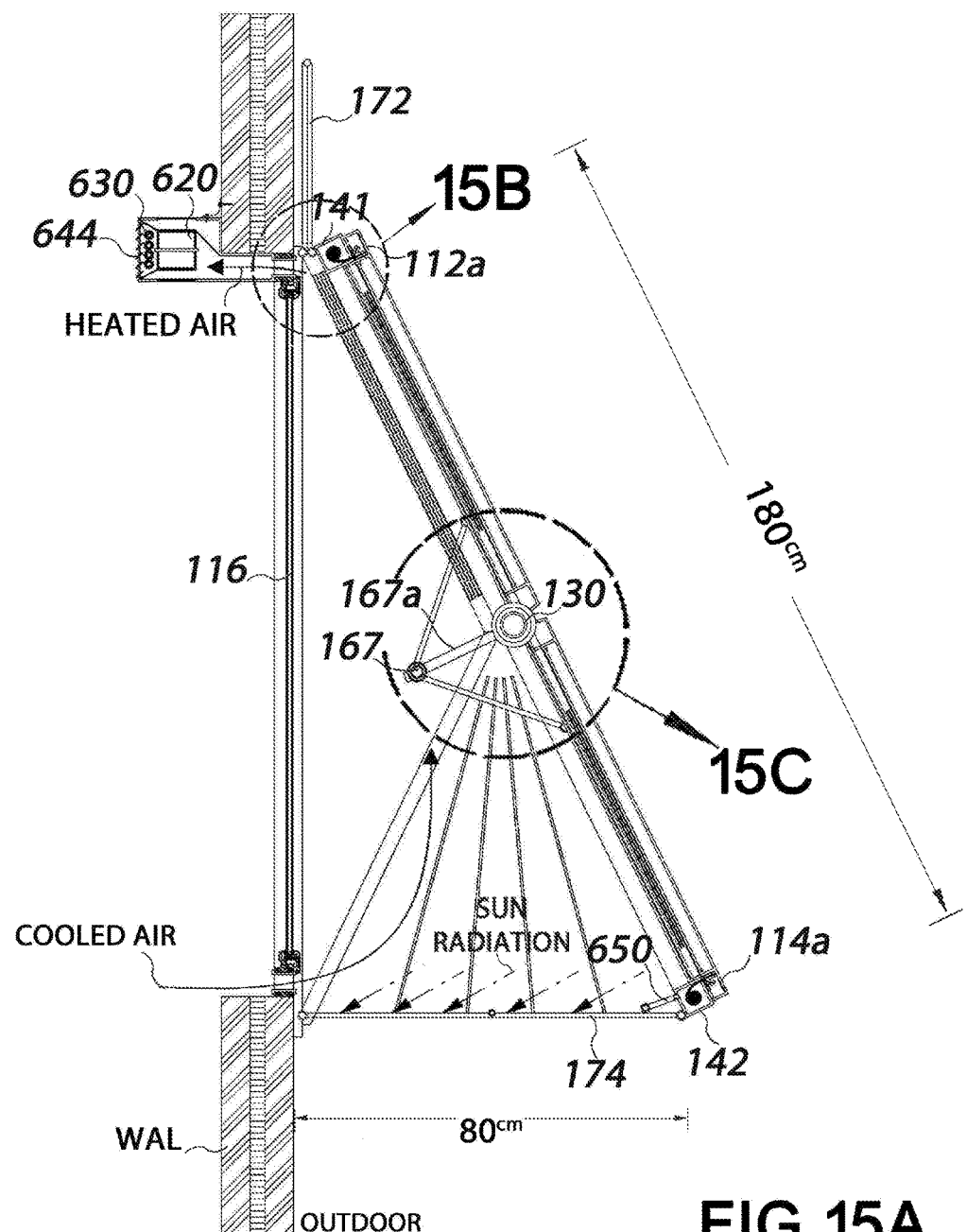
FIGS. 15A-C illustrate views of the window structure and its components shown in FIG. 14 in the tilted upwards position and in closed position.

FIGS. 15A and 16A are a left-side view of the same example window structure 100 in air heating and sunshade positions schematically showing the air flow and the window performance. FIGS. 15B and 16B show detailed views of components of the window structure 100 in the closed (15B) and open (16B) positions. As discussed above, in certain examples, when the second window pane 112 opens for ventilation, triangular-shaped folding shell 166 opens toward the exterior of the building. In an example, the folding shell 166 is connected to the first end 112a of the second window pane 112 on one side and to the first portion of the main frame 140 on the other side. The folding shell consists of three spring-shaped bars 166a which may move on a rail 166b. The spring-shaped bars 166a are connected in rear of the rail 166b to a spring around a rotation center 178. The spring-shaped bars 166a and the rotation center 178 may pull the folding shell 166 toward the main frame 140 when the second window pane 112 is closed. The folding shell 166 returns to the original location upon opening the second window pane 112 to maximize the air drift for ventilation.

Figure 15C:
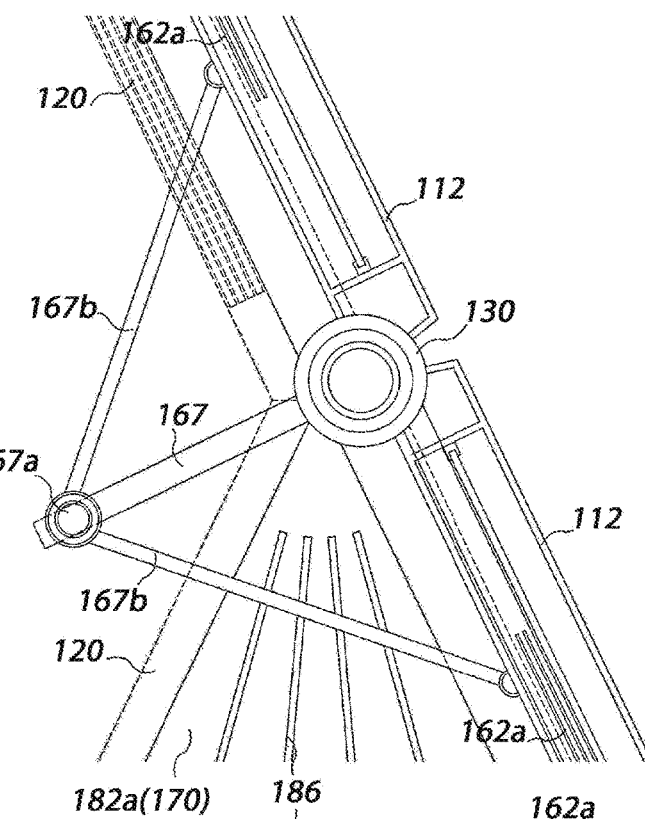
Figure 16C:
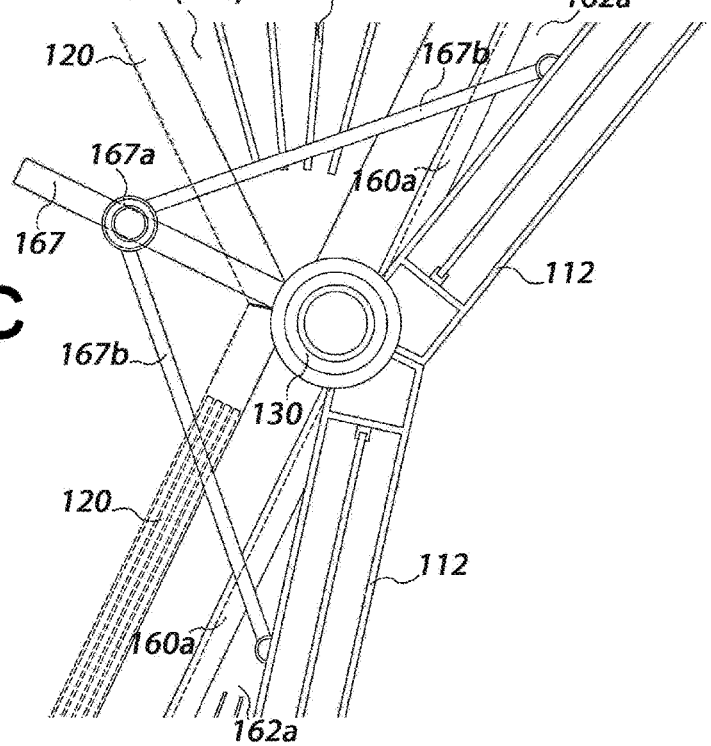

FIGS. 15C and 16C show detailed views of an example of a window opening mechanism when the window structure 100 is in the closed (15C) and open (16C) positions. In the example shown, the window opening mechanism includes opening lever 167, bar 167a, and levers 167b. The function of the window opening mechanism and its components has been described above in detail.

By producing warm air during cold seasons of the year through using renewable solar energy, this product may help save money. It also may prevent air pollution and reduce consumption of fossil fuels. Further, in warm seasons, by creating a pleasant natural ventilation through suction and expulsion of air inside the building, it may cause a reduction in consumption of electricity.

Figure 17A:
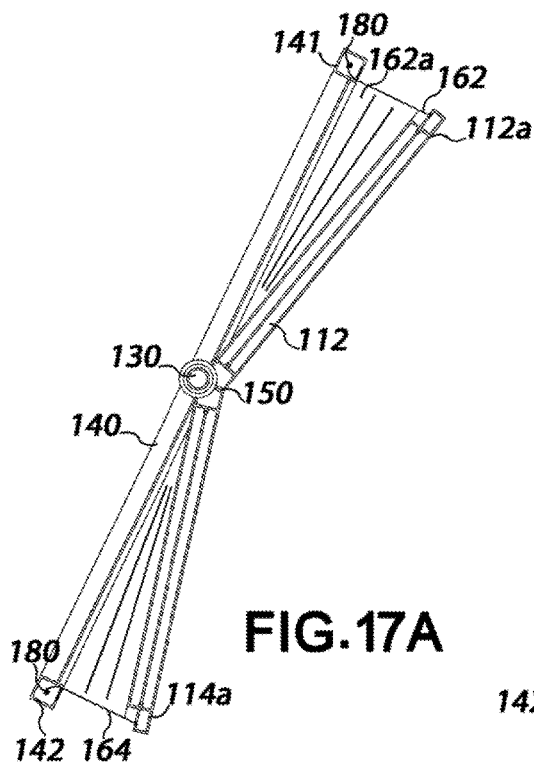
FIG. 17A-17B illustrates views of a portion of the window structure in an open position for ventilation and in a closed position.
Figure 17B:
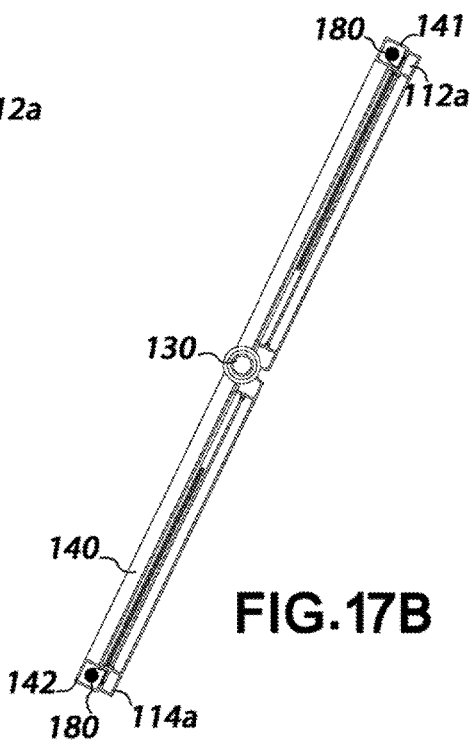
Figure 18A:
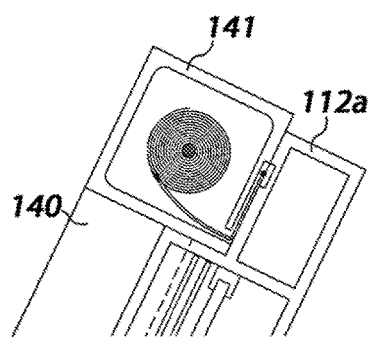
FIG. 18A-18B illustrates views of another portion of the window structure in a closed position and in an open position for ventilation.
Figure 18B:
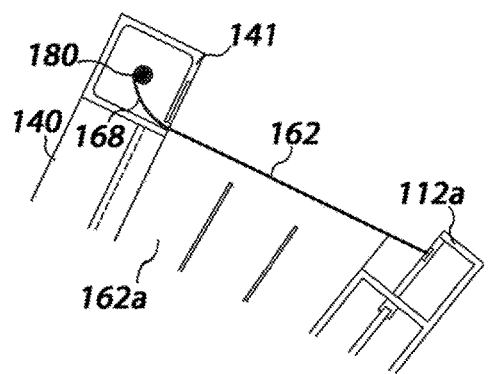

FIGS. 17A and 17B illustrate views of a portion of the window structure 100 in an open position (FIG. 17A) for ventilation and in a closed position (FIG. 17B). FIGS. 18A and 18B illustrate views of another portion of the window structure in a closed position (FIG. 18A) and in an open position (FIG. 18B) for ventilation.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

What is claimed is:

1. A window structure configured to form a principal chamber enclosing a first window pane installed in an exterior wall of a building, the window structure comprising:
    a main frame including a first frame portion, a second frame portion located opposite the first frame portion, and a second window pane located between the first frame portion and the second frame portion;
    an axial hinge configured to allow to the main frame to tilt about a first axis disposed at a first distance from the first window pane, such that the main frame may be tilted between a first position in which the first frame portion is positioned less than the first distance from the first window pane and the second frame portion is positioned more than the first distance from the first window pane, and a second position in which the first frame portion is positioned more than the first distance from the first window pane and the second frame portion is positioned less than the first distance from the first window pane;
    a first surface configured to absorb solar energy and located adjacent to the second frame portion; and
    a first pane-frame connector,
    wherein the window structure is configured to, when the main frame is tilted in the first position, position the first surface in a first orientation allowing the first surface to directly receive sunlight through the second window pane,
    wherein the window structure is configured to, when the main frame is tilted in the second position, position the first surface in a second orientation in which the first surface is prevented from directly receiving sunlight through the second window pane,
    wherein the main frame and the second window pane have exterior surfaces facing outward of the building,
    wherein the window structure is in a closed position when the exterior surface of the second window pane is parallel to the exterior surface of the main frame, and the window structure is in an open position when the exterior surface of the second window pane is at a non-parallel angle with the exterior surface of the main frame and a first end of the second window pane is separated from the first frame portion of the main frame,
    wherein the first pane-frame connector connects the first end of the second window pane to the first frame portion of the main frame when the first end of the second window pane is separated from the first frame portion of the main frame, and
    the first pane-frame connector is flexible and is configured to multiply a force of suction of air exterior to the building and to discharge internal air of the building.

2. The window structure of claim 1, wherein the first surface has a solar absorptance of at least 0.6.

3. The window structure of claim 1, wherein the first surface has a dark or black finish.

4. The window structure of claim 1, wherein the first surface is configured to warm first air in an interior space of the principal chamber by absorbing the solar energy transmitted through the second window pane and transferring the solar energy to the first air in the principal chamber.

5. The window structure of claim 4, further comprising a fan configured to transmit the first air warmed by the first surface from the interior space of the principal chamber to an interior of the building.

6. The window structure of claim 5, further comprising tubing connecting the interior space of the principal chamber to the interior of the building,
    wherein second air is transmitted from the interior of the building into the interior space of the principal chamber through the tubing, and the first surface is further configured to warm the second air within the principal chamber.

7. The window structure of claim 1, further comprising:
    a fan;
    a heating element disposed on or near the fan,
    wherein when the energy absorbed by the first surface is not sufficient to warm air to a desired temperature, the air is warmed by the heating element, and the fan is configured to transmit the air warmed by the heating element to an interior of the building.

8. The window structure of claim 7, further comprising solar energy cells disposed on or adjacent an upper end of the principal chamber, wherein the heating element is powered by electricity produced by the solar energy cells.

9. The window structure of claim 1, further comprising:
    a third window pane having a first end that is separated from the second portion of the main frame when the window structure is in the open position; and
    a second pane-frame connector connecting the first end of the third window pane to the second portion of the main frame when the first end of the third window pane is separated from the second portion of the main frame.

10. The window structure of claim 9, further comprising an opening mechanism configured to substantially simultaneously separate the first end of the second window pane from the first portion of the main frame and the first end of the third window pane from the second portion of the main frame.

11. The window structure of claim 10, wherein the opening mechanism comprises a sliding lever.

12. The window structure of claim 7, further comprising a distributing panel disposed in the interior of the building and including the heating element.

13. The window structure of claim 12, wherein the distributing panel further includes an electrical energy storage element configured to supply electrical energy to the heating element.

14. The window structure of claim 12, further comprising tubing configured to transfer the air from an interior space of the principal chamber to the distributing panel.

15. The window structure of claim 14, where the tubing comprises a main tube connected to the fan and auxiliary tubes connecting the main tube to the interior space of the principal chamber.

16. The window structure of claim 1, further comprising a handle disposed in the interior space of the principal chamber, wherein the handle is configured to tilt the main frame between the first and second positions.

17. The window structure of claim 1, further comprising the first window pane.

18. A method of forming a window structure to form a principal chamber enclosing a first window pane installed in an exterior wall of a building, the method comprising:
   providing a main frame including a first frame portion, a second frame portion located opposite the first frame portion, and a second window pane located between the first frame portion and the second frame portion;
   attaching the main frame to the exterior wall of the building so as to tilt about a first axis disposed at a first distance from the first window pane, such that the main frame may be tilted between a first position in which the first frame portion is positioned less than the first distance from the first window pane and the second frame portion is positioned more than the first distance from the first window pane, and a second position in which the first frame portion is positioned more than the first distance from the first window pane and the second frame portion is positioned less than the first distance from the first window pane; and
   attaching a first energy-absorbing surface to a location adjacent to the second frame portion,
   wherein the formed window structure is configured to, when the main frame is tilted in the first position, position the first surface in a first orientation allowing the first energy-absorbing surface to directly receive sunlight through the second window pane,
   wherein the formed window structure is configured to, when the main frame is tilted in the second position, position the first surface in a second orientation in which the first energy-absorbing surface is prevented from directly receiving sunlight through the second window pane
   wherein the main frame and the second window pane have exterior surfaces facing outward of the building,
   wherein the window structure is in a closed position when the exterior surface of the second window pane is parallel to the exterior surface of the main frame, and the window structure is in an open position when the exterior surface of the second window pane is at a non-parallel angle with the exterior surface of the main frame and a first end of the second window pane is separated from the first frame portion of the main frame, the method further comprising:
connecting via a first pane-frame connector the first end of the second window pane to the first frame portion of the main frame when the first end of the second window pane is separated from the first frame portion of the main frame, wherein the first pane-frame connector is flexible and is configured to multiply a force of suction of air exterior to the building and to discharge internal air of the building.

* * * * *